United States Patent [19]
Oakley

[11] Patent Number: 6,076,953
[45] Date of Patent: *Jun. 20, 2000

[54] DIGITIZING PROBE

[75] Inventor: Thomas F. Oakley, Florence, S.C.

[73] Assignee: The ESAB Group, Inc., Florence, S.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/541,868

[22] Filed: Oct. 10, 1995

[51] Int. Cl.$^7$ .................................................. G06F 19/00
[52] U.S. Cl. ............................ 364/474.37; 364/474.03; 324/173
[58] Field of Search .................. 364/474.03, 474.37, 364/474.05, 474.29; 318/568.16, 568.1, 568.11, 568.17, 569; 324/173, 174, 207, 208

[56] References Cited

U.S. PATENT DOCUMENTS

| | | | |
|---|---|---|---|
| 4,820,980 | 4/1989 | Dodson-Edgars | 324/207 |
| 4,999,555 | 3/1991 | Yamazaki et al. | 364/474.04 |
| 5,115,401 | 5/1992 | Oyama et al. | 364/474.37 |
| 5,317,517 | 5/1994 | Matsuura et al. | 364/474.03 |
| 5,343,402 | 8/1994 | Matsuura et al. | 364/474.37 |

FOREIGN PATENT DOCUMENTS

| | | |
|---|---|---|
| 5928442 | 8/1982 | Japan . |
| 61-290302 | 6/1985 | Japan . |
| WO 88/01747 | 3/1988 | WIPO . |

*Primary Examiner*—Reba I. Elmore
*Assistant Examiner*—Thomas E. Brown
*Attorney, Agent, or Firm*—Bell Seltzer Intellectual Property Law Group; Alston & Bird LLP

[57] ABSTRACT

A digitizing probe and method is disclosed for accurately locating the edges and determining the orientation of a generally planar, metal workpiece relative to the orthogonal axes of a computer numerical control ("CNC") cutting machine. The CNC cutting machine includes a microcomputer controller for moving a transverse gantry in the longitudinal and lateral directions which define the orthogonal axes of the cutting machine. The digitizing probe and the cutter of the cutting machine are mounted on separate vertically movable support arms secured to support brackets provided on the transverse gantry. Thus, the digitizing probe and the cutter may be independently positioned at predetermined heights above the top surface of the workpiece. The digitizing probe includes a plurality of analog inductive proximity sensors arranged in a fixed, predetermined array. The digitizing probe is positioned above the workpiece and moved by the controller incrementally in the longitudinal and lateral directions around the perimeter of the workpiece. The electrical signals from the sensors are continuously monitored by the controller such that the edges of the workpiece are located and the orientation of the workpiece relative to the orthogonal axes is determined. The digitizing probe maps the footprint of a workpiece, or a remnant workpiece, to select a particular machined part to be produced from the workpiece with a minimum amount of scrap.

10 Claims, 4 Drawing Sheets

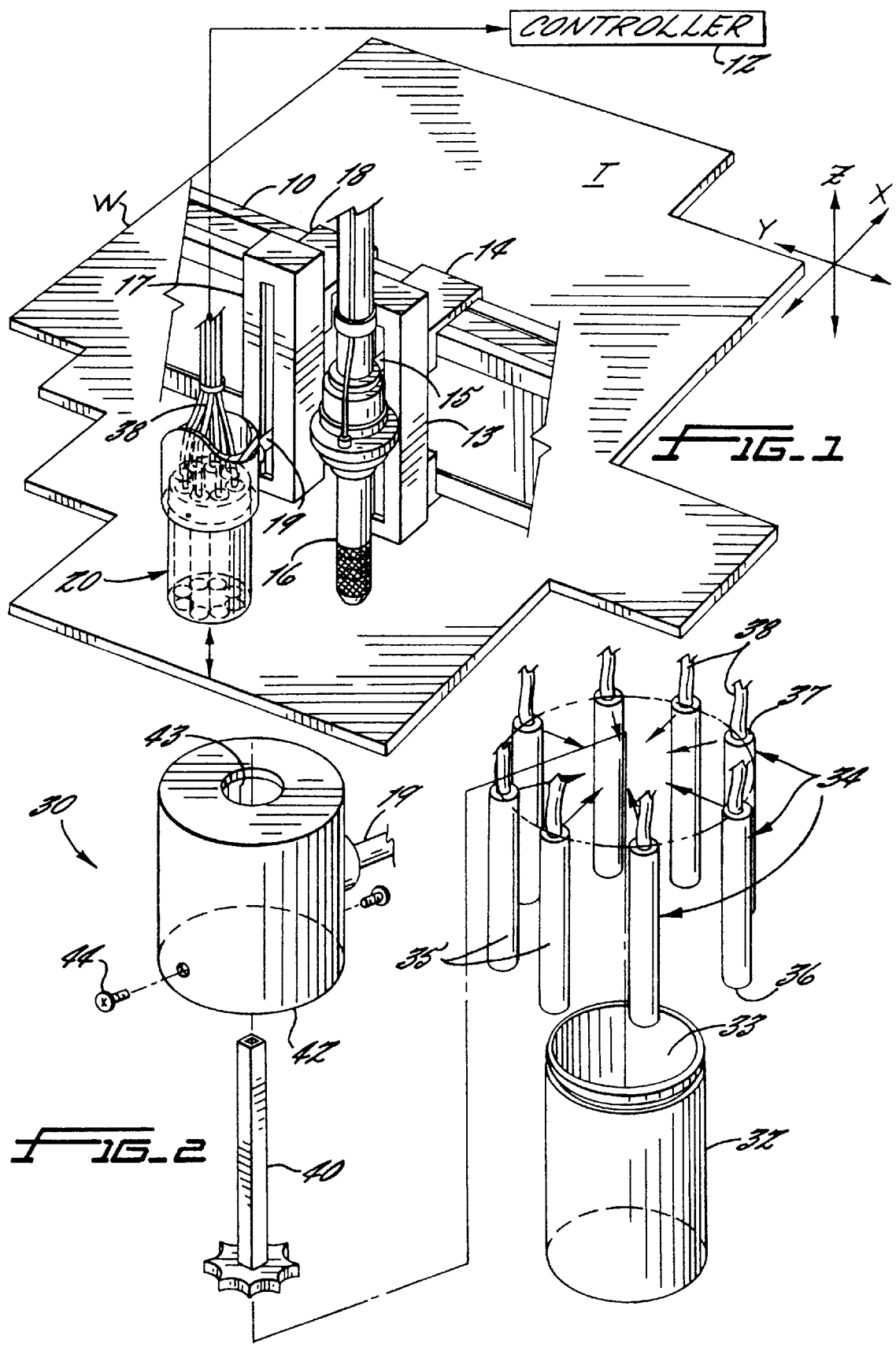

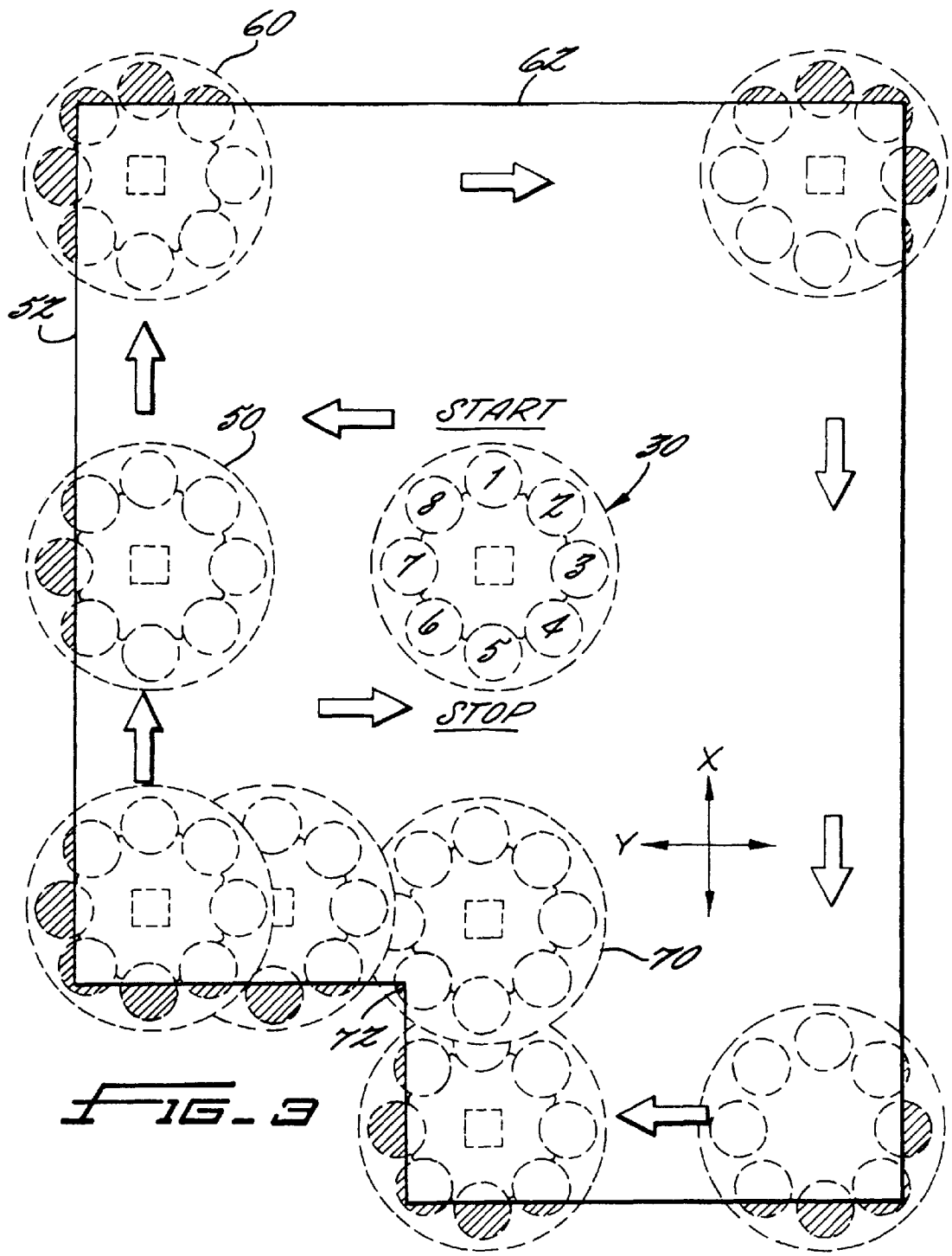

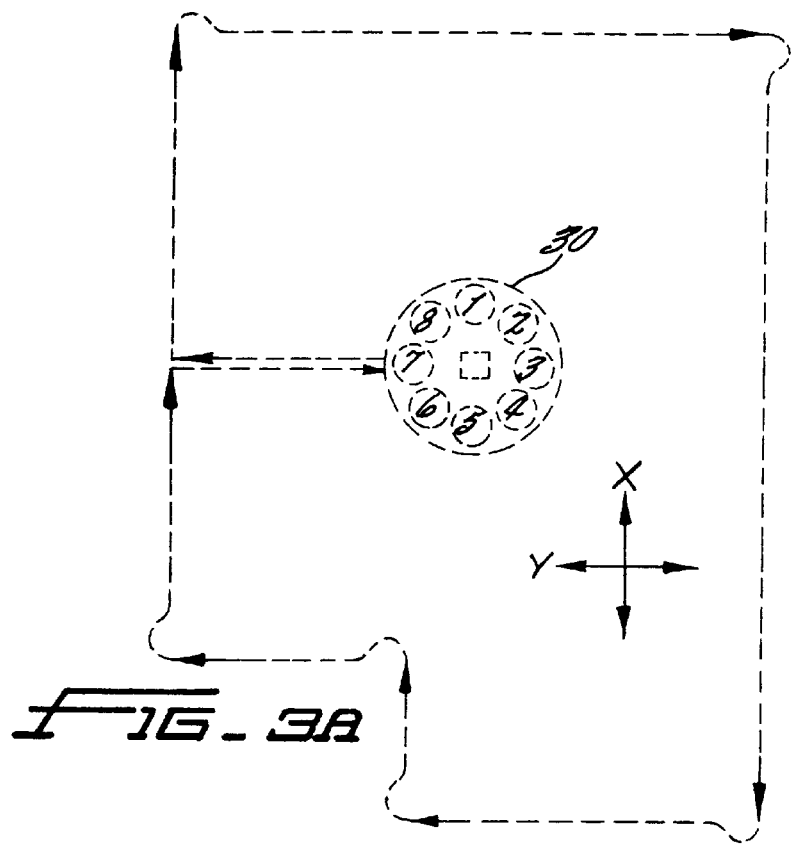
FIG_3A
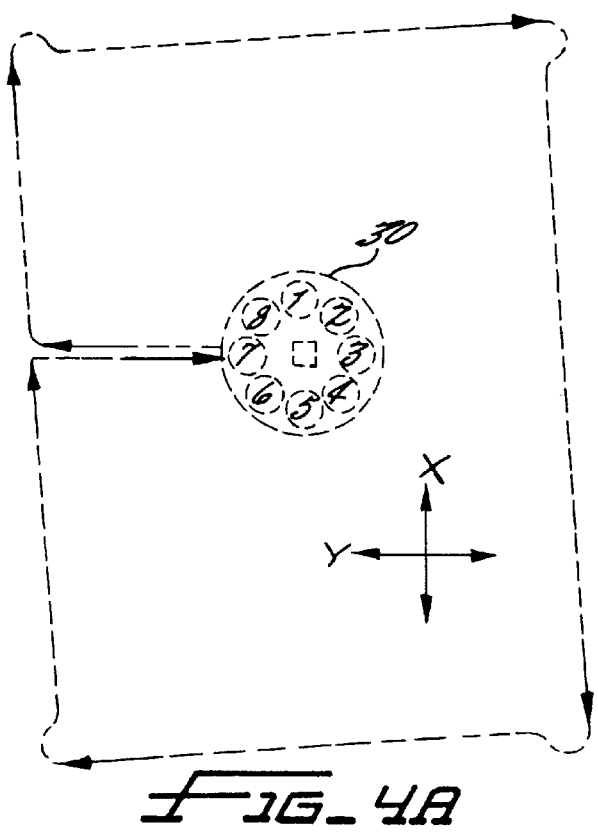
FIG_4A

DIGITIZING PROBE

FIELD OF THE INVENTION

The invention relates to a digitizing probe and method for locating the edges of a metal plate. More particularly, the invention relates to a digitizing probe and method for locating the edges and determining the orientation of a generally planar, metal workpiece relative to the orthogonal axes of a computer numerical control ("CNC") cutting machine.

BACKGROUND OF THE INVENTION

Cutting machines are typically used to accurately produce large machined parts having complex shapes from generally planar, metal workpieces. It is desirable to automate the cutting process to increase productivity and quality while decreasing manufacturing and labor costs. A particular method of automating the cutting process, namely numerical control of the cutter, has been applied to cutting machines since at least the late 1950's. Numerical control involves the use of a programmed controller to control the motion of the cutter with numeric commands, and thus produce a part having a predetermined size and shape. With the availability of microcomputers and interactive software, modern numerical control cutting machines typically employ computer numerical control ("CNC") systems.

The use of CNC to automate the cutting process requires the controller to locate the edges and determine the orientation of the workpiece relative to the orthogonal axes of the cutting machine. Locating the edges and determining the orientation of the workpiece is typically accomplished by manually positioning a digitizing probe at successive locations around the perimeter of the workpiece. The digitizing probe provides the controller with the orthogonal coordinates of the digitized locations so that the software of the controller can map the perimeter, and thus the footprint of the workpiece relative to the orthogonal axes of the cutting machine. Locating the edges and determining the orientation of the workpiece is necessary to verify that a particular part having a predetermined size and shape can be produced from the workpiece, and to reduce the amount of scrap that results from machining the part.

Conventional CNC cutting machines require an operator to manually position the digitizing probe above at least three corners of a square or rectangular shaped workpiece. From the digitized information, the controller maps the footprint of the workpiece and determines the optimum path for the cutter to produce the desired part. Manual digitizing on a conventional CNC cutting machine, however, is time consuming and is limited to workpieces that are generally square or rectangular shaped unless additional locations on the perimeter of the workpiece are digitized. Accordingly, the unused portions of prior workpieces, known in the cutting machine art as scraps or remnants, that are not generally square or rectangular shaped cannot easily be used to produce additional parts.

Automated methods of locating the edges and determining the orientation of a workpiece relative to the orthogonal axes of a CNC cutting machine include the use of sensors known in the art as line followers, or line trackers. For example, U.S. Pat. No. 4,518,856, issued May 21, 1985 to Blackington discloses an optical thin line-tracing sensor. The head of the sensor includes a source optic fiber for transmitting a light beam in the direction of a sheet of material having a line drawn, printed or otherwise affixed to the material. The material surrounding the line has a contrasting energy-reflective property for providing electrical signals representative of the movement of the sensor relative to the line.

The use of the optical thin line-tracing sensor disclosed in the patent to Blackington to locate the edges and determine the orientation of a workpiece relative to the orthogonal axes of a CNC machine creates a significant problem. Optical line-tracking sensors rely on the optical contrast between the line being followed and the material of the background. Typically, the supporting table of a CNC cutting machine is made of metal and includes a horizontal grate consisting of longitudinal and lateral rails. Thus, there is little optical contrast between the edges of the workpiece and the supporting table even when an edge of the workpiece is adjacent a rail of the supporting table. The perimeter of the workpiece may be painted to provide optical contrast between the edges of the workpiece and the background. Painting the perimeter of the workpiece, however, is time consuming and accordingly diminishes the advantages achieved by automating the cutting process.

It is possible to use a capacitive proximity sensor to locate the edges and determine the orientation of a workpiece relative to the orthogonal axes of a CNC machine. A line follower that measures capacitance, however, likewise creates a significant problem. The responsiveness of a capacitive proximity sensor to most common metals is insufficient without amplification to provide the precision necessary to accurately locate the edges and determine the orientation of a workpiece relative to the orthogonal axes of the CNC cutting machine.

Regardless of the type of sensor used to map the perimeter of the workpiece, the output from the sensor is typically either a digital or an analog electrical signal. The electrical signal from a digital sensor does not require conversion (from an analog signal) for further processing by the controller. A digital sensor, however, indicates whether any portion of the sensor is above the workpiece. Thus, the electrical signal from a digital sensor is an "on" or an "off" indication and does not indicate how much of the sensor is above the workpiece. Consequently, a digital sensor is not as precise as an analog sensor, and the digitizing probe tracks the perimeter of the workpiece with pronounced zig-zag movements. To achieve the same precision and smooth movement obtained from a predetermined array of analog sensors would require significantly more, or significantly smaller digital sensors.

Accordingly, those skilled in the art of CNC cutting machines have found it difficult to automatically locate the edges and determine the orientation of a generally planar, metal workpiece relative to the orthogonal axes of the cutting machine. In particular, those skilled in the art of CNC cutting machines have found it difficult, if not impossible, to utilize remnant workpieces that are not generally square or rectangular shaped, or that include internal cutouts, to accurately produce complex machined parts having a predetermined size and shape. As will be made apparent by the following description, the digitizing probe and method of the invention solves these and other problems.

SUMMARY OF THE INVENTION

In view of the noted deficiencies in the prior art, it is an object of the invention to provide an improved digitizing probe for automatically locating the edges of a workpiece.

It is a more particular object of the invention to provide an improved digitizing probe and method for automatically locating the edges and determining the orientation of a generally planar, metal workpiece relative to the orthogonal axes of a CNC cutting machine.

It is another object of the invention to provide a digitizing probe for locating the edges of a workpiece that does not rely on the optical contrast between the edges of the workpiece and the supporting table of a CNC cutting machine.

It is another object of the invention to provide a digitizing probe for locating the edges of a workpiece including a sensor that is responsive to most common metals without amplification.

It is another object of the invention to provide a digitizing probe for locating the edges of a workpiece including a sensor that provides an electrical signal which indicates how much of the sensor is above the workpiece.

The invention provides a digitizing probe and method for locating the edges and determining the orientation of a generally planer, metal workpiece relative to the orthogonal axes of a CNC cutting machine. The CNC cutting machine includes a controller for moving a transverse gantry in the longitudinal and lateral directions which define the orthogonal axes of the cutting machine. A non-contact cutter, such as an oxygen-jet flame cutter, a laser cutter, or a water-jet cutter; or a contact cutter, such as a router, is mounted to a vertically movable cutter support arm secured to a cutter support bracket provided on the transverse gantry. In a preferred embodiment, the cutter is a non-contact plasma gas torch manufactured by The ESAB Group of Florence, S.C.

The digitizing probe is preferably mounted to a vertically movable digitizing probe support arm secured to a digitizing probe support bracket provided on the transverse gantry adjacent the cutter support bracket, and is electrically connected to the controller of the cutting machine, as will be described. The CNC cutting machine further includes a horizontal supporting table for supporting the workpiece in a plane parallel to the plane defined by the orthogonal axes of the cutting machine. Accordingly, the controller of the cutting machine can position the cutter and the digitizing probe at a predetermined vertical height above the top surface of the workpiece.

The workpiece is preferably a generally planer, square or rectangular shaped, metal plate. The workpiece may, however, be the unused portion of a workpiece previously used to produce a machined part. The unused portion is known to those skilled in the art of cutting machines as a scrap, or remnant workpiece. The perimeter of a remnant workpiece is typically not square or rectangular shaped, and may include internal cutouts. Accordingly, manually locating the edges and determining the orientation of a remnant workpiece is time consuming, subject to operator error, and diminishes the advantages achieved by automating the cutting process.

The controller of the cutting machine is preferably a microcomputer that utilizes interactive software to move the transverse gantry in the longitudinal and lateral directions which define the orthogonal axes of the cutting machine. The controller preferably includes means for processing an electrical signal, typically in the form of a voltage, from a line follower sensor to locate the edges and determine the orientation of the workpiece relative to the orthogonal axes of the cutting machine. The controller preferably further includes means for commanding the transverse gantry to move the cutter according to pre-programmed commands to produce a machined part having a predetermined size and shape from the workpiece. In a preferred embodiment, the controller is an ANC40 VISION tracking-control manufactured by ATAS GmbH of Seligenstadt, Germany.

The digitizing probe includes a plurality of analog inductive proximity sensors arranged in a predetermined fixed array. Preferably, each of the sensors includes an elongate, cylindrical inductor coil having a sensing end, or base, opposite the workpiece, and a coupling end electrically connected to the controller of the CNC cutting machine. A conducting conduit extends outwardly from the coupling end of each inductor coil for transmitting the electrical signal from the corresponding sensor to the controller.

The array of sensors is fixed to a vertically extending stem centrally received within a hollow, cylindrical housing and secured to the housing in a conventional manner. Preferably, an inverted, cup-shaped cover having a central opening therethrough is positioned over the housing with the conducting conduits of the sensors extending through the opening of the cover to the controller. The cover is preferably secured to the housing by at least one set screw, and the lower edge of the cover preferably extends below the plane defined by the bases of the sensors to protect the sensors from inadvertently contacting the top surface of the workpiece and thereby damaging the bases of the sensors.

The cover is rigidly mounted to the vertically movable digitizing probe support arm extending longitudinally outwardly from the digitizing probe support bracket. Thus, the array of sensors is linearly moveable with the transverse gantry in the longitudinal and lateral directions which define the orthogonal axes of the cutting machine. Accordingly, the controller may position the digitizing probe, and thus the bases of the sensors, at any location above the top surface of the workpiece by moving the transverse gantry in the longitudinal and lateral directions which define the orthogonal axes of the cutting machine.

In operation, the workpiece (or the remnant) is placed on the supporting table of the CNC cutting machine. The digitizing probe mounted on the transverse gantry is positioned above the top surface of the workpiece at a location within the perimeter of the workpiece. The array of sensors is then lowered in the direction of the workpiece until the electrical signal of at least one of the sensors exceeds a predetermined maximum voltage. The predetermined voltage represents the optimum height of the sensors above the top surface of the workpiece for digitizing the workpiece.

The controller next moves the digitizing probe in the longitudinal or lateral direction until the electrical signal of at least one of the sensors falls below a predetermined voltage. The predetermined minimum voltage indicates that a known portion of the corresponding sensor has passed over an edge of the workpiece. The controller then moves the digitizing probe clockwise around the perimeter of the workpiece while continuously monitoring the electrical signals of the sensors. The digitizing probe moves in the lateral or longitudinal direction of the cutting machine until the electrical signal of a second sensor, located 90 degrees from the first sensor, falls below the predetermined minimum voltage. When the voltage of the second sensor falls below the predetermined minimum, the known portion of the second sensor has passed over an edge of the workpiece.

The controller continues to move the digitizing probe clockwise around the perimeter of the workpiece until all of the edges of the workpiece have been located and the digitizing probe has returned to its starting position. The controller then processes the digitizing information, maps the footprint of the workpiece, and determines whether a particular machined part having a predetermined size and shape can be produced from the workpiece.

The digitizing probe and method of the invention can locate the edges of a workpiece that is not square or rectangular shaped, and can determine the orientation of a workpiece having edges that are not aligned with the orthogonal axes of the cutting machine. For example, if the first edge located by the digitizing probe is not perpendicular to the longitudinal or lateral directions, the voltages of the sensors immediately adjacent to the sensor that located the edge of the workpiece will be less than the voltages of the remaining sensors and will not be equal. Accordingly, the controller can determine the slope of the edge of the workpiece relative to the orthogonal axes of the cutting machine by comparing the voltages of the sensors adjacent to the sensor that located the edge.

The controller then moves the digitizing probe clockwise around the perimeter of the workpiece incrementally in the lateral and longitudinal directions according to the slope of the edge of the workpiece until the electrical signal of a second sensor, located 90 degrees from the first sensor, falls below the predetermined minimum voltage. The controller then determines the slope of the second edge by comparing the voltages of the sensors immediately adjacent to the second sensor. Once the controller of the CNC cutting machine has mapped the footprint of the workpiece, the controller can scan the workpiece inside the perimeter for internal cutouts that are larger than about ¼ the diameter of the bases of the sensors. The controller may also include means for selecting a particular part from a group of parts having predetermined sizes and shapes that can be produced using the maximum amount of the workpiece with the minimum amount of waste.

As is now apparent from the preceding description, the digitizing probe and method of the invention automatically digitizes a workpiece, or the unused portion of a workpiece previously used to produce a machined part (i.e., a remnant workpiece). The controller of the cutting machine then maps the footprint of the workpiece and determines whether a machined part having a predetermined size and shape can be produced from the workpiece, or the remnant workpiece.

BRIEF DESCRIPTION OF THE DRAWINGS

Having set forth some of the objects and advantages of the invention, other objects and advantages will appear as the description of the invention proceeds in conjunction with the following drawings in which:

FIG. 1 is a perspective view of certain components of a CNC cutting machine incorporating a digitizing probe according to the invention;

FIG. 2 is an exploded perspective view of the sensor array assembly of the digitizing probe of FIG. 1;

FIG. 3 is a schematic illustrating the method of the invention for locating the edges of a workpiece using the digitizing probe of FIG. 1 wherein the edges of the workpiece are aligned with the orthogonal axes of the cutting machine;

FIG. 3A is a diagram showing the trace of the path of the digitizing probe of FIG. 1 around the perimeter of the workpiece of FIG. 3;

FIG. 4A is a diagram showing the trace of the path of the digitizing probe of FIG. 1 around the perimeter of the workpiece of FIG. 4.

DETAILED DESCRIPTION OF THE PREFERRED EMBODIMENTS

Figure 4:
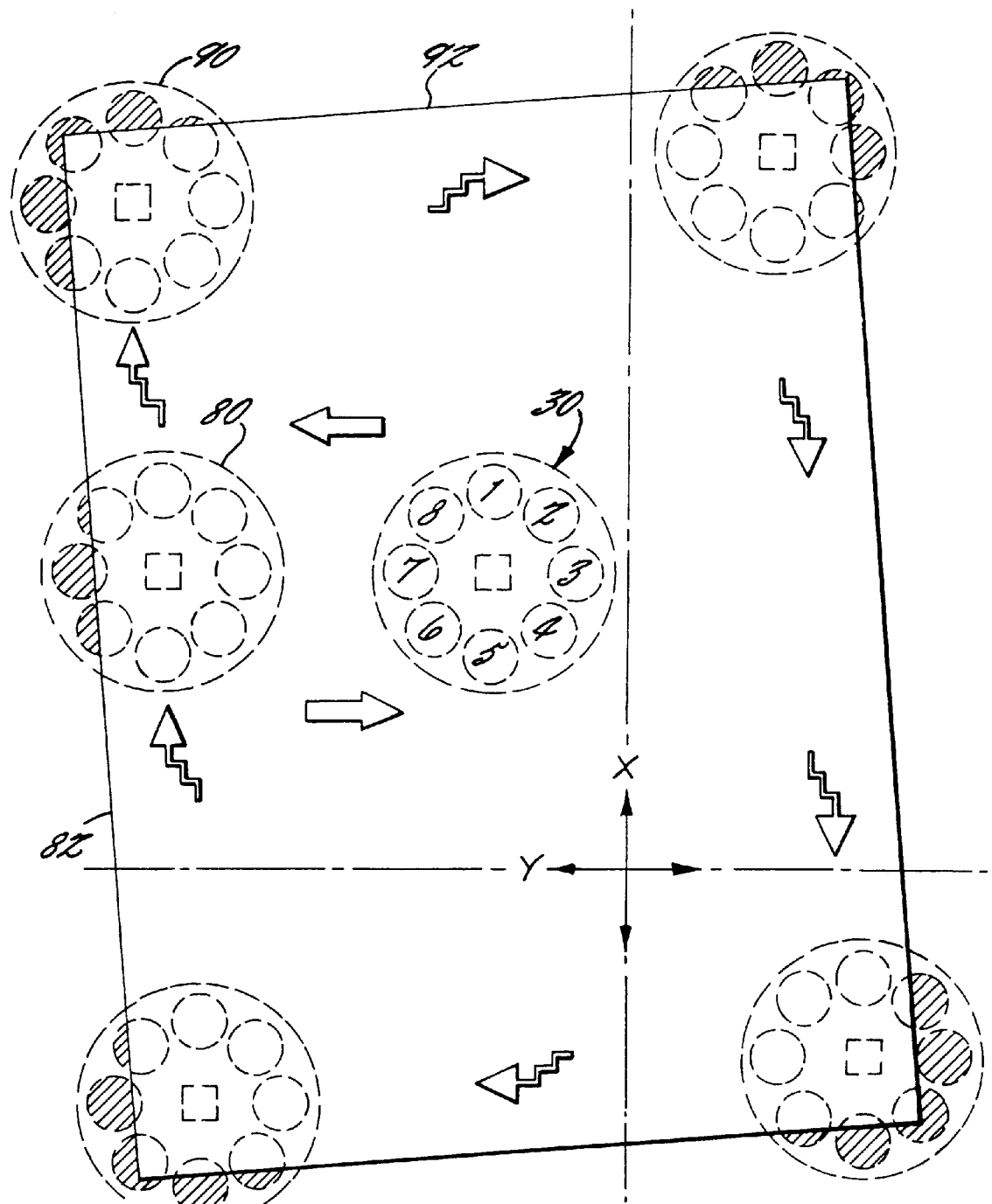
FIG. 4 is a schematic illustrating the method of the invention for locating the edges and determining the orientation of a workpiece using the digitizing probe of FIG. 1 wherein the edges of the workpiece are not aligned with the orthogonal axes of the cutting machine.

Referring to the accompanying drawings, FIG. 1 illustrates certain components of a conventional CNC cutting machine comprising a controller, indicated schematically at 12, for moving a transverse gantry 10. The controller 12 may be any means for automating the movement of the transverse gantry 10, but preferably is a microcomputer that utilizes interactive software to move the transverse gantry in the longitudinal X and lateral Y directions which define the orthogonal axes of the cutting machine, and the vertical Z direction perpendicular to the orthogonal axes of the cutting machine. The transverse gantry 10 is aligned with the lateral Y axis and is movable in the longitudinal X and lateral Y directions by conventional drive means. The CNC cutting machine further comprises a supporting table (not shown) in a plane parallel to the plane defined by the orthogonal axes of the cutting machine for supporting a workpiece W below the transverse gantry 10. Typically, the supporting table is made of metal and comprises a horizontal grate consisting of longitudinal and lateral rails.

The workpiece W is typically made of metal and is generally planer such that it is thin relative to its dimensions in the longitudinal X and lateral Y directions. Preferably, the workpiece W is square or rectangular shaped and is continuous inside its perimeter. The workpiece W may, however, be the unused portion of a workpiece previously used to produce one or more machined parts on the cutting machine. The unused portion is known to those skilled in art of cutting machines as a scrap, or remnant, workpiece. The remnant workpiece may be irregularly shaped and may include holes or cutouts inside the perimeter of the workpiece. Preferably, however, the edges of the workpiece are substantially linear and continuous as shown in FIG. 1.

The transverse gantry 10 comprises a cutter support bracket 14 for mounting a cutter 16 on the transverse gantry of the cutting machine. The cutter 16 may be any tool for machining a part having a predetermined size and shape from the workpiece W. For example, the cutter 16 may be a non-contact cutter; such as an oxygen-jet flame cutter, a laser cutter or a water-jet cutter. The cutter 16 may also be a contact cutter such as a router. Preferably, as shown in FIG. 1, the cutter 16 is a plasma gas torch manufactured by the ESAB Group of Florence, S.C. and disclosed in U.S. Pat. No. 5,124,525 issued to Severance Jr., and assigned to the present assignee, the disclosure of which is expressly incorporated herein.

The cutter support bracket 14 comprises positioning means 13 for permitting vertical movement of the cutter 16 to a predetermined working height above the top surface T of the workpiece W. Positioning means 13 may, for example, be a ball screw drive powered by a DC servomotor. The cutter 16 is secured in a conventional manner to a cutter support bracket arm 15 extending longitudinally outwardly from the positioning means 13 of the cutter support bracket 14. The cutter 16, cutter support bracket 14, positioning means 13 and cutter support bracket arm 15 are well known to those skilled in the art of cutting machines and do not form a part of the present invention.

The transverse gantry 10 further comprises a digitizing probe support bracket 18 for mounting a digitizing probe, indicated generally at 20, according to the invention, above the top surface T of the workpiece W. The digitizing probe support bracket 18 comprises positioning means 17 for permitting vertical movement of the digitizing probe 20 to a predetermined optimum height above the top surface T of the workpiece W. The digitizing probe 20 is secured in a conventional manner to a support bracket arm 19 extending longitudinally outwardly from the positioning means 17 of the digitizing probe support bracket 18.

The digitizing probe 20 comprises a sensor array assembly 30, shown in the exploded view of FIG. 2, that is electrically connected to the controller 12 of the cutting machine. Sensor array assembly 30 comprises a hollow, cylindrical housing 32 defining a cavity 33 for centrally receiving a plurality of sensors 34 therein. The sensors 34 may be any known line followers, or line trackers, that generate an electrical signal proportional to the amount of the surface area of the sensor that is above the top surface T of the workpiece W. For example, sensors 34 may be analog capacitive proximity sensors or analog optical line-tracing sensors. Preferably, however, the sensors 34 are analog inductive proximity sensors.

Inductive proximity sensors are preferred over capacitive proximity sensors because the electrical signal from a capacitive proximity sensor is not responsive enough to most common metals, and thus must be amplified for processing by the controller 12 of the cutting machine. Inductive proximity sensors are preferred over optical line-tracing sensors because the electrical signal from an optical line-tracing sensor relies on the optical contrast between the line, or edge, being followed and the material of the background, i.e, air or a rail of the supporting table that is made of a metal similar to the workpiece.

Further, the amplitude of the electrical signal prior to amplification depends on the reflectivity of the line, or edge, being followed. Although the edges of the workpiece may be painted with a reflective paint to increase the optical contrast between the workpiece and the table, doing so requires an additional time consuming step which diminishes the advantages achieved by automating the cutting process. Accordingly, it is preferred that the sensors 34 be analog inductive proximity sensors so that the electrical signals generated by the sensors do not require amplification, and the edges of the workpiece do not need to be painted with an optically reflective material.

The sensors 34 are analog sensors because digital sensors generate electrical signals that indicate whether any part of the sensor is above the workpiece W. Thus, the sensor is "on" if any portion of the sensor is over the workpiece W, or is "off" if no portion of the sensor is above the workpiece. Accordingly, a digital sensor can only determine the location of the edge of the workpiece W within an accuracy equal to approximately one half the diameter of the sensor.

Further, if the edge of the workpiece is not aligned with one of the orthogonal axes of the CNC cutting machine, an array of digital sensors cannot determine the orientation, or slope, of the edge relative to the orthogonal axes of the cutting machine. Accordingly, the digitizing probe will follow the edge of the workpiece in a series of pronounced zig-zag movements. The digitizing probe 20 will move in a series of zig-zag movements because the controller 12 cannot interpolate the electrical signals between adjacent sensors to accurately determine the location and orientation of the edge of the workpiece relative to the orthogonal axes of the CNC machine. The electrical signals from the analog sensors, however, may be converted to digital signals by controller 12 prior to processing the digitizing information.

Each of the sensors 34 comprises an elongate, cylindrical inductor coil 35 having a sensing end, or base 36 opposite the workpiece W, and a coupling end 37. Each sensor 34 further comprises an insulated electrical conductor 38 for transmitting an electrical signal comprising a voltage proportional to how much of the base 36 of the sensor 34 is above the top surface T of the workpiece W. The conductor 38 extends from the base 36 of the sensor 34 through an opening provided in the coupling end 37 of the inductor coil 35 to the controller 12 of the CNC cutting machine.

The sensors 34 are arranged in a predetermined fixed array and secured in a conventional manner, such as by epoxy, to an elongate, vertical stem 40. In the embodiment illustrated in the accompanying drawings, the sensors 34 are arranged symmetrically in a circular array around the stem 40. The sensors 34 may, however, be arranged in any predetermined array in which the distance between the centers of any two sensors may be determined by the controller 12. The sensors 34 and the stem 40 are centrally received within the housing 32 and secured in a conventional manner such that the stem and sensors are aligned with the vertical Z direction, and the bases 36 of the sensors are parallel and opposite to the top surface T of the workpiece W.

An inverted, cup-shaped cover 42 having a central opening 43 therethrough is placed over the housing 32 such that the bundle of conductors 38 pass through the opening. Cover 42 is secured to housing 32 with at least one set screw 44, and is attached to the digitizing probe support bracket arm 19 such that the sensors 34 are vertically movable with the cover when positioning means 17 positions the sensor array assembly 30 above the top surface T of the workpiece W.

The operation of the digitizing probe 20 to locate the edges of a workpiece W having edges aligned with the orthogonal axes of the CNC machine is illustrated in FIG. 3. The workpiece W is placed on the supporting table of the CNC cutting machine and the operator positions the digitizing probe 20 above the top surface T of the workpiece W such that the probe is entirely within the perimeter of the workpiece. Initially, the digitizing probe 20 is positioned sufficiently high above the workpiece W so that the voltages of the sensors 34 are approximately zero. The controller commands the positioning means 17 of the digitizing probe support bracket 18 to lower the digitizing probe 20 until the voltage of at least one of the sensors 34 exceeds a predetermined value.

For example, if the voltage range of the analog inductive proximity sensors 34 is 0–10 volts, the digitizing probe 20 is lowered by positioning means 17 until the voltage of at least one of the sensors exceeds, for example, 8 volts. As the digitizing probe 20 is moved over the top surface T of the workpiece W, the voltages of the sensors 34 will fluctuate due to irregularities, such as peaks and valleys, in the top surface T. Accordingly, the controller 12 continuously monitors the voltages of the sensors 34 to maintain the predetermined optimum height of the digitizing probe 20 above the workpiece W during the digitizing process.

Once the digitizing probe 20 is positioned at the predetermined optimum height above the workpiece W, the operator selects an initial direction of travel for the controller 12 to move the digitizing probe. As selected for the example of FIG. 3, the controller 12 moves the transverse gantry 10 (and thus the digitizing probe 20) in the positive lateral Y direction. As the digitizing probe moves across the workpiece W in the positive lateral Y direction, the voltage of each of the sensors 34 is initially approximately 8 volts.

As one of the sensors 34 reaches and passes over the left edge 52 of the workpiece W, its voltage drops in proportion to the amount of the surface area of the sensor, represented by cross hatching in FIG. 3, that has passed beyond the edge of the workpiece. For example, as 25% of the surface area of a sensor 34 passes beyond the edge of the workpiece W, the voltage of the sensor drops to approximately 6 volts. As 50% of the surface area of a sensor passes beyond the edge of the workpiece, the voltage of the sensor drops to approximately 4 volts.

When the sensor #7 in the example of FIG. 3 reaches and passes beyond the edge of the workpiece, its voltage begins to drop. As the controller 12 continues to move the digitizing probe 20 in the positive lateral Y direction, the voltages of the sensors #6 and #8 adjacent to sensor #7 also begin to drop. Because the left edge 52 of the workpiece W in FIG. 3 is aligned with one of the orthogonal axes of the cutting machine, the voltages of the sensors #6 and #8 remain approximately equal to each other.

When the digitizing probe 20 reaches the location indicated in FIG. 3 at 50, the voltages of the sensors #7, #6 and #8 are, for example, approximately 2, 6 and 6 volts respectively. By comparing the voltages of sensors #6 and #8 (which are equal), the controller 12 determines that the left edge 52 of the workpiece is parallel to the longitudinal X axis. Accordingly, the controller 12 moves the digitizing probe clockwise around the perimeter of the workpiece W in the positive longitudinal X direction. Regardless of the initial direction of travel selected by the operator, the controller is pre-programmed to move the digitizing probe 20 clockwise around the perimeter of the workpiece W.

The controller 12 continuously monitors the voltages of the sensors 34 as the digitizing probe 20 moves in the positive longitudinal X direction. When the digitizing probe reaches and passes the upper edge 62 of the workpiece W, the voltage of the sensor #1 located 90 degrees from sensor #7, will drop in proportion to the amount of the surface area of the sensor that has passed beyond the upper edge of the workpiece. When the digitizing probe 20 reaches the location indicated in FIG. 3 at 60, the voltages of the sensors #1, #8 and #2 are, for example, approximately 2, 4.5 and 6 volts respectively.

Because the voltage of sensor #8 is less than the voltage of sensor #2, the controller 12 moves the digitizing probe 20 in a series of small increments in the positive longitudinal X direction and the negative lateral Y direction. Accordingly, the trace of the path of the digitizing probe 20, illustrated in FIG. 3A, includes a slight zig-zag portion at each corner of the workpiece W. As the voltage of sensor #8 approaches the voltage of sensor #2, the controller 12 moves the digitizing probe 20 clockwise around the perimeter of the workpiece W in the negative lateral Y direction only.

The controller 12 continues to move the digitizing probe 20 in this manner until the probe reaches the location indicated in FIG. 3 at 70. As the digitizing probe 20 reaches and passes onto the workpiece W at the inside corner 72, the voltages of sensors #8, #7 and #6 increase to approximately 8 volts, respectively. In response to this condition, the controller 12 moves the digitizing probe 20 in a series of small increments in the positive lateral Y and the negative longitudinal X directions until the voltage of the sensor #5 is, for example, approximately 2 volts, and the voltages of the sensors #6 and #4 are approximately equal. Thereafter, controller 12 moves the digitizing probe 20 clockwise around the perimeter of the workpiece W in the positive lateral Y direction.

Once the digitizing probe 20 again reaches the location indicated in FIG. 3 at 50, controller 12 moves the probe in the negative lateral Y direction back to its starting location. During the digitizing process, the controller 12 continuously receives digitizing information from the digitizing probe 20 and converts the digitizing information to linear vectors having short, finite length to develop the mathematical representation of the footprint of the workpiece W illustrated in FIG. 3A. By comparing the footprint of the workpiece W to the footprint of a machined part having a predetermined size and shape, the controller can determine whether the part can be produced from the digitized workpiece.

The operation of the digitizing probe 20 to locate the edges and determine the orientation of a workpiece W having edges that are not aligned with the orthogonal axes of the CNC machine is illustrated in FIG. 4. The workpiece W is placed on the supporting table of the cutting machine and the digitizing probe 20 is positioned above and entirely within the perimeter of the workpiece W. The probe is then lowered to the predetermined optimum height above the top surface T of the workpiece and the operator selects the initial direction of travel of the probe as previously described.

As selected for the example of FIG. 4, the controller 12 moves the digitizing probe 20 in the positive lateral Y direction. As the digitizing probe 20 moves in the positive lateral Y direction, the voltages of each of the sensors 34 is initially approximately 8 volts. As sensor #7 reaches and passes beyond the edge of the workpiece W, its voltage begins to drop in proportion to the amount of the surface area of the sensor that has passed beyond the edge of the workpiece. As previously described, the voltages of the adjacent sensors #6 and #8 also drop until the voltage of at least one of the sensors #6 and #8 is reduced to a predetermined value.

Because the left edge 82 of the workpiece W in FIG. 4 is not aligned with one of the orthogonal axes of the cutting machine, the voltages of the sensors #6 and #8 will not remain equal. When the digitizing probe 20 reaches the location indicated in FIG. 4 at 80, the voltages of the sensors #7, #6 and #8 are, for example, approximately 2, 6 and 7 volts respectively. By comparing the voltages of sensors #6 and #8, the controller determines that the left edge 82 of the workpiece W is not parallel to the longitudinal X axis and calculates the slope of the left edge of the workpiece at location 80. The controller 12 then moves the digitizing probe 20 clockwise around the perimeter of the workpiece W in a series of small increments in the positive longitudinal X direction and the positive lateral Y direction according to the slope of the left edge 82 such that the voltage of sensor #7 remains approximately constant.

The controller 12 continuously monitors the voltages of the sensors as the digitizing probe 20 moves incrementally in the positive longitudinal X and positive lateral Y directions to follow the left edge 82 of the workpiece W. As the digitizing probe 20 reaches and passes beyond the upper edge 92 of the workpiece W, the voltage of the sensor #1 drops in proportion to the amount of the surface area of the sensor that has passed beyond the upper edge of the workpiece. When the digitizing probe 20 reaches the location indicated in FIG. 4 at 90, the voltages of the sensors #1, #8 and #2 are, for example, approximately 2, 4.5 and 7 volts respectively.

Because the voltage of sensor #8 is less than the voltage of sensor #2, the controller 12 moves the digitizing probe 20 in a series of small increments in the positive longitudinal X and the negative lateral Y directions according to the slope of the upper edge 92 at location 90 calculated by the controller 12 such that the voltage of sensor #1 remains approximately constant. As previously described, because the voltage of sensor #8 is momentarily influenced by the additional amount of the surface area of the sensor that is beyond the left edge 82 of the workpiece W, the path of the digitizing probe includes a slight zig-zag portion at each corner of the workpiece. As the controller 12 continues to calculate the slope of the upper edge 92, the digitizing probe 20 will move according to the trace of the path of the digitizing probe 20 illustrated in FIG. 4A.

The controller 12 continues to move the digitizing probe 20 clockwise around the perimeter of the workpiece in this manner until the digitizing probe 20 again reaches the location indicated in FIG. 4 at 80. The controller 12 then moves the digitizing probe 20 in the negative lateral Y direction until the probe is returned to its starting location. As the digitizing probe 20 follows the perimeter of the workpiece W, the controller 12 continuously receives digitizing information from the digitizing probe. As previously described, the controller 12 converts the digitizing information to the mathematical representation of the footprint of the workpiece W illustrated in FIG. 4A. By comparing the footprint of the workpiece W to the footprint of a machined part having a predetermined size and shape, the controller can determine whether the part can be produced from the digitized workpiece.

As will be obvious to those skilled in the art of CNC cutting machines, once the footprint of the workpiece has been mapped, the digitizing probe 20 of the invention may be used to scan the top surface T within the perimeter of the workpiece W for internal holes and cutouts. The only limitation presented by the digitizing probe 20 of the invention is that the cutouts must be larger than about ¾ the diameter of the sensors 34.

Accordingly, the invention provides a digitizing probe and a method for accurately locating the edges and determining the orientation of a generally planer, metal workpiece relative to the orthogonal axes of a CNC cutting machine. Obviously, certain modifications will be apparent to those skilled in the art that have not been fully described and disclosed above. It is intended, however, that the illustrative embodiments of the invention disclosed herein not be limiting, and that all embodiments within the scope of the invention be included and that the embodiments disclosed herein and in the accompanying drawings shall be interpreted as illustrative and not in a limiting sense.

That which is claimed is:

1. A computer numeric control cutting machine for cutting a metal part from a generally planar workpiece, the cutting machine being adapted for movement in longitudinal and lateral directions defining orthogonal axes and comprising a cutter mounted to the cutting machine for cutting the metal part from the workpiece;

a supporting table for supporting the workpiece horizontally below said cutter;

a probe mounted to the cutting machine for locating the edges and determining the orientation of the workpiece relative to the orthogonal axes of the cutting machine, a controller electrically connected to said cutter and said probe;

means electrically connected to said controller for moving said cutter and said probe in the longitudinal and lateral directions; and wherein said probe comprises a plurality of inductive proximity sensors disposed in a predetermined arrangement which permits the edges of the workpiece to be accurately located and oriented with respect to the orthogonal axes of the cutting machine.

2. The cutting machine as set forth in claim 1 wherein said plurality of sensors are arranged in a symmetric circular arrangement.

3. The cutting machine as set forth in claim 2 wherein each of said sensors comprises an analog inductive proximity sensor.

4. The cutting machine according to claim 1 wherein said probe further comprises an elongate, vertically extending stem for fixedly securing said plurality of sensors in the predetermined arrangement;

a hollow sensor housing having a cavity for receiving said stem and said plurality of sensors therein; and an inverted, cup-shaped cover secured to the outer surface of said hollow sensor housing and having a central opening therethrough defining a vertical axis perpendicular to the orthogonal axes of the cutting machine, said opening permitting electrical conductors to pass from said sensors through said cover to said controller.

5. The cutting machine according to claim 1 wherein said means for moving said cutter and said probe in the longitudinal and lateral directions comprises a transverse gantry mounted on the cutting machine and aligned with one of the orthogonal axes;

a cutter support bracket fixed to said transverse gantry for mounting the cutter, said cutter support bracket comprising a cutter support arm extending outwardly from said cutter support bracket in one of the longitudinal and lateral directions and securing said cutter; and a probe support bracket fixed to said transverse gantry for mounting the probe, said probe support bracket comprising a probe support arm extending outwardly from said probe support bracket in one of the longitudinal and lateral directions and securing said probe.

6. A method of locating the edges and determining the orientation of a generally planar, metal workpiece relative to the orthogonal axes of a computer numerical control cutting machine comprising a controller and a digitizing probe which comprises a plurality of sensors arranged in a predetermined array and each electrically connected to the controller, the method comprising the steps of providing means electrically connected to the controller for moving the digitizing probe in the longitudinal and lateral directions which define the orthogonal axes of the cutting machine;

moving the digitizing probe above the workpiece according to a predetermined series of movements using the moving means until a first sensor of the digitizing probe transmits an electrical signal proportional to the amount of the surface area of the sensor that has passed beyond a first edge of the workpiece to locate the first edge; said moving step including a) placing the workpiece on a horizontal supporting table adjacent the cutting machine;

b) positioning the digitizing probe above the workpiece and entirely within the perimeter of the workpiece;

c) lowering the digitizing probe to a predetermined optimum height above the workpiece; and d) selecting one of the longitudinal and lateral directions for moving the digitizing probe until the first sensor transmits an electrical signal proportional to the amount of the surface area of the sensor that has passed beyond the edge of the workpiece to locate the first edge of the workpiece;

comparing the electrical signals of the sensors of the digitizing probe adjacent the first sensor to determine the orientation of the first edge relative to the orthogonal axes of the cutting machine;

repeating the steps of moving and comparing until all edges of the workpiece are located and the orientation of all edges of the workpiece relative to the orthogonal axes of the cutting machine are determined.

7. The method of claim 6 comprising the further steps of mapping the footprint of the workpiece using the controller to process the digitizing information from the digitizing probe controller; and comparing the footprint of the workpiece to the footprint of a metal part having a predetermined size and shape to determine whether the part can be produced from the workpiece.

8. The method of claim 6 wherein the step of lowering the digitizing probe comprises monitoring the electrical signals of the sensors of the digitizing probe to determine when at least one of the electrical signals exceeds a predetermined maximum.

9. The method of claim 6 wherein the repeating step comprises moving the digitizing probe using the moving means in a clockwise direction around the perimeter of the workpiece until all of the edges of the workpiece have been located and the orientation of all of the edges of the workpiece have been determined relative to the orthogonal axes of the cutting machine; and mapping the footprint of the workpiece using the controller and comparing the footprint of the workpiece to the footprint of a metal part having a predetermined size and shape to determine whether the part can be produced from the workpiece.

10. The method of claim 6 wherein the plurality of sensors of the digitizing probe are a plurality of analog inductive proximity sensors arranged in a symmetric circular arrangement.

* * * * *

UNITED STATES PATENT AND TRADEMARK OFFICE
CERTIFICATE OF CORRECTION

PATENT NO.   : 6,076,953　　　　　　　　　　　　　　　　Page 1 of 1
DATED         : June 20, 2000
INVENTOR(S)  : Oakley It is certified that error appears in the above-identified patent and that said Letters Patent is hereby corrected as shown below:

Title page,
Item [56] References Cited, U.S. PATENT DOCUMENTS, insert the following:
-- 3,389,312    6/1968    Redman
   3,725,761   4/1973    Webber
   4,518,856   5/1985    Blackington
   5,124,525   6/1992    Severance, Jr., et al. --.

Item [56] References Cited, FOREIGN PATENT DOCUMENTS,
Line 1, "5928442" should read -- 59-28442 --.

Signed and Sealed this

Eighteenth Day of September, 2001

Attest:

NICHOLAS P. GODICI
Attesting Officer　　Acting Director of the United States Patent and Trademark Office